US007636915B1

(12) United States Patent
DiVittorio (10) Patent No.: US 7,636,915 B1
(45) Date of Patent: Dec. 22, 2009

(54) MULTI-LEVEL MULTI-VARIABLE CONTROL PROCESS PROGRAM EXECUTION SCHEME FOR DISTRIBUTED PROCESS CONTROL SYSTEMS

(75) Inventor: Nick P. DiVittorio, North Attleboro, MA (US)

(73) Assignee: Invensys Systems, Inc., Foxboro, MA (US)

( * ) Notice: Subject to any disclaimer, the term of this patent is extended or adjusted under 35 U.S.C. 154(b) by 756 days.

(21) Appl. No.: 09/449,912

(22) Filed: Dec. 2, 1999

(51) Int. Cl.
*G06F 9/46* (2006.01)
*G06F 17/00* (2006.01)

(52) U.S. Cl. .................. 718/100; 718/102; 718/103; 700/90

(58) Field of Classification Search ......... 709/100–108; 700/28, 90; 364/200; 358/568; 718/100–108
See application file for complete search history.

(56) References Cited

U.S. PATENT DOCUMENTS

| | | | | |
|---|---|---|---|---|
| 3,725,864 | A * | 4/1973 | Clark et al. ..................... | 710/6 |
| 4,786,847 | A * | 11/1988 | Daggett et al. ............ | 318/568.2 |
| 4,788,647 | A * | 11/1988 | McManus et al. ........... | 700/287 |
| 4,796,178 | A * | 1/1989 | Jennings et al. ............. | 709/103 |
| 5,010,482 | A * | 4/1991 | Keller et al. .................... | 710/52 |
| 5,347,446 | A * | 9/1994 | Iino et al. ...................... | 700/29 |
| 5,423,076 | A * | 6/1995 | Westergren et al. ........... | 455/86 |
| 5,481,716 | A * | 1/1996 | Morshedi et al. ............ | 717/106 |
| 5,504,897 | A * | 4/1996 | Gans et al. ............... | 707/104.1 |
| 5,526,794 | A * | 6/1996 | Messih et al. ............... | 123/492 |

(Continued)

OTHER PUBLICATIONS

Buchanan, Matt, et al. "Coordinated Thread Scheduling for Workstation Clusters Under Windows NT", Proceedings of the Usenix Windows NT Workshop, Aug., 1997, pp. 3, 1st column, and p. 5, Section 2.2.3.*

(Continued)

*Primary Examiner*—Meng-Ai An
*Assistant Examiner*—Kenneth Tang
(74) *Attorney, Agent, or Firm*—Leydig, Voit & Mayer Ltd.

(57) ABSTRACT

A method and control processor are disclosed for executing a set of control tasks defining dynamic model-based interactive control of an industrial process wherein two sets of executable program code are executed according to a multi-tiered program execution priority scheme. The control processor includes an embedded control task that is periodically executed to carry out computations in accordance with a process control model. The output of the computations include setpoint values that are distributed to relevant control blocks executed in the control processor. The embedded control task is performed at a relatively low execution priority status within the control processor.

The control processor also includes a set of control blocks. The set of control blocks are executed at a relatively high execution priority status within the control processor. The set of control blocks include, for example, a set of regulatory control blocks that are responsible for transmitting control signals to controlled elements of the industrial process and for receiving industrial process status data from process variable transmitters that sense particular process operation parameters (e.g., temperature, pressure, mass flow, etc.). The set of control blocks, in a particular embodiment of the invention also include supervisory control blocks that are responsible for providing setpoints and performing support tasks with regard to the operation of the control process including managing the transfer of data between the control processor and a communicatively linked workstation.

25 Claims, 7 Drawing Sheets

U.S. PATENT DOCUMENTS

| | | | | |
|---|---|---|---|---|
| 5,891,178 A | * | 4/1999 | Mann et al. | 607/27 |
| 6,101,599 A | * | 8/2000 | Wright et al. | 712/228 |
| 6,105,053 A | * | 8/2000 | Kimmel et al. | 718/105 |
| 6,330,483 B1 | * | 12/2001 | Dailey | 700/28 |
| 6,445,963 B1 | * | 9/2002 | Blevins et al. | 700/44 |
| 6,549,945 B1 | * | 4/2003 | Sinibaldi et al. | 709/226 |
| 6,874,144 B1 | * | 3/2005 | Kush | 718/103 |

OTHER PUBLICATIONS

International Search Report for corresponding PCT Application No. PCT/US00/42503, dated Jun. 28, 2001.

* cited by examiner

MULTI-LEVEL MULTI-VARIABLE CONTROL PROCESS PROGRAM EXECUTION SCHEME FOR DISTRIBUTED PROCESS CONTROL SYSTEMS

AREA OF THE INVENTION

The present invention generally relates to the area of distributed process control systems, and more particularly to control program deployment/execution schemes for control processors utilized to supervise and control the operation of field devices and other control processors in a distributed process control system.

BACKGROUND OF THE INVENTION

There are a number of industries which have evolved to integrate complex industrial processes with distributed computerized control systems for those processes. Two such examples are the oil refining industry and the power generating industry. Others include a wide variety of manufacturing facilities, including for example paper manufacturing facilities. These industries utilize process control systems including control elements that are distributed, but the operation and control of the separate elements is, by necessity, highly integrated.

The integrated industrial control systems have evolved to include distributed control processors at localized industrial equipment sites. The distributed control processors communicate with industrial process control hardware in the system and with one or more control system operator consoles (workstations) at a central operating station. The control processors communicate with industrial process equipment such as pumps and furnaces to set/sense particular values affecting/representing the state of a controlled process. Examples of such processor control systems are the I/A SERIES (Registered Trademark of The Foxboro Company) industrial process control systems. The I/A SERIES industrial process control systems incorporate a Nodebus LAN link (IEEE 802.3) to communicatively connect workstations, gateways, and control processors. The control processors, in turn, are connected to fieldbus modules via a fault tolerant fieldbus link (IEEE 1118).

The distributed control system components of the I/A SERIES industrial control systems communicate at a local level with a set of special purpose process control nodes to receive a set of process values representing the state of a controlled process. At a higher level, the control processors communicate with other control processors and workstations over a Nodebus LAN. Workstations and control processors execute software at the distributed locations to render a set of control values based upon the set of process values.

Process control systems are generally arranged into regulatory and supervisory levels. Regulatory control blocks reside at the lowest level of the process control hierarchy. The regulatory control blocks are responsible for input and output signals received from and transmitted to field devices including sensors and control elements. PID control blocks, also considered regulatory control blocks, respond to sensed process variables according to supplied setpoint values and render a correction output value. Regulatory control blocks generally reside in control processors, or even in field devices.

Supervisory programs reside at a relatively higher level of the process control system. Supervisory control programs coordinate the operation of the multiple control points in a process control system. Supervisory control logic establishes setpoint values for the PID control blocks and other regulatory control blocks, and implement an overall process control strategy that may itself be carried out at several levels of operation. In order to ensure that the finite computation capacity of control processors is not exhausted by supervisory control program execution, supervisory control is generally executed within workstations that are connected to control processors via network links. The output values of supervisory control programs are transmitted to the appropriate control processors for use in the PID and other regulatory control blocks.

Control processors today, having both greater primary memory capacity and increased central processor speed, are considerably more powerful computers than their predecessors of the early 1990's. The increased computation power of today's control processors has created interest in migrating supervisory tasks from workstations to the control processors for which the supervisory tasks are executed. Under such a distributed processing scheme, supervisory and regulatory control tasks for a controlled process are executed at the local level by the distributed control processors connected to a control network. The workstations in the control network provide a user interface and supporting programs enabling a user to view the status, and modify the execution, of the controlled process.

Several advantages result from such a control distribution scheme. Network traffic decreases for a given control strategy, since a workstation is not called upon to regularly compute and update setpoint values stored at a control processor node in a process control network. As a result, the maximum size of a process, measured by the number of control points, under the control of a single network may increase due to the reduced control processor/workstation communications. Since control processor-to-workstation communications are greatly reduced, a supervisory control program in the control processor may potentially respond faster to changes in dynamic parameters of the controlled process, thereby facilitating tighter control over process elements. Control over the process is fault-tolerant, since a control processor will continue to control the process without interruption in the event that the communication path between the control processor node and its corresponding workstation is rendered inoperative.

The role of the workstations in providing real-time control commands would be reduced if supervisory control tasks are shifted to the control processors. Operation complexity of the workstations may decrease because the importance and frequency of use of the communication path to the control processor(s) is reduced. The workstations would be freed from real-time short-cycle-time tasks to provide new and enhanced user interface facilities and process configuration tools.

SUMMARY OF THE INVENTION

In recognition of the advantages that can be achieved by migrating supervisory control to a local process controller in a distributed process control environment, a method and control processor for executing a set of control tasks defining dynamic model-based interactive control of an industrial process are claimed wherein two sets of executable program code are executed according to a multi-tiered program execution priority scheme.

The control processor includes an embedded control task that is periodically executed to carry out computations in accordance with a process control model. The output of the computations include setpoint values that are distributed to relevant control blocks executed in the control processor. The embedded control task is performed at a relatively low execution priority status within the control processor.

The control processor also includes a set of control blocks. The set of control blocks are executed at a relatively high execution priority status within the control processor. The set of control blocks include, for example, a set of regulatory control blocks that are responsible for transmitting control signals to controlled elements of the industrial process and for receiving industrial process status data from process variable transmitters that sense particular process operation parameters (e.g., temperature, pressure, mass flow, etc.). The set of control blocks, in a particular embodiment of the invention also include supervisory control blocks that are responsible for providing set points and performing support tasks with regard to the operation of the control process including managing the transfer of data between the control processor and a communicatively linked workstation.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF A PREFERRED EMBODIMENT

Figure 1A:
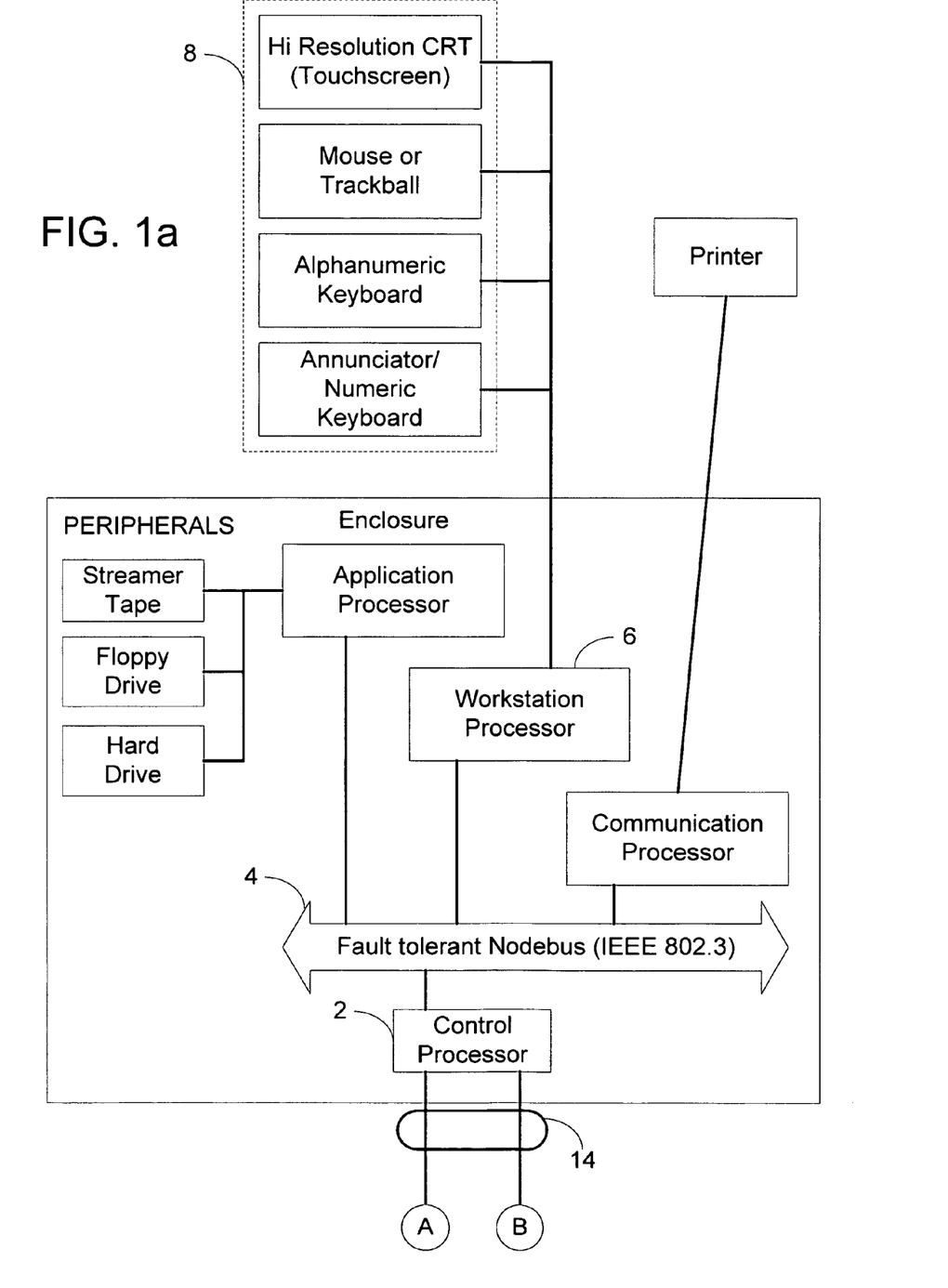
FIGS. 1a and 1b schematically depict a portion of an exemplary process control network into which the invention may be incorporated.

Before describing the structure and operation of a control processor embodying the present invention, one should understand the general operating environment of such control processors. Therefore, turning to FIGS. 1a and 1b, a schematic block diagram depicts an illustrative distributed industrial process control system. In particular, a control processor 2 communicates with various interface, I/O, and information storage devices as illustrated in FIG. 1a via a fault tolerant local area network bus 4. An example of such the network bus 4 is a fault tolerant Nodebus (IEEE 802.3). An example of an exemplary control processor is an I/A Series Control Processor 60 (CP60) of The Foxboro Company, an Invensys Company.

Also connected to the network bus 4 is a workstation 6 including software and associated user interface devices such as a high resolution monitor/touchscreen, a mouse/trackball, an alphanumeric keyboard, and an annunciator/numeric keyboard. An example of such a workstation is the AW51E Workstation of The Foxboro Company. The workstation 6 facilitates monitoring operation of the control processor 2 and the status of industrial processes operating under the control processor 2.

Figure 1B:
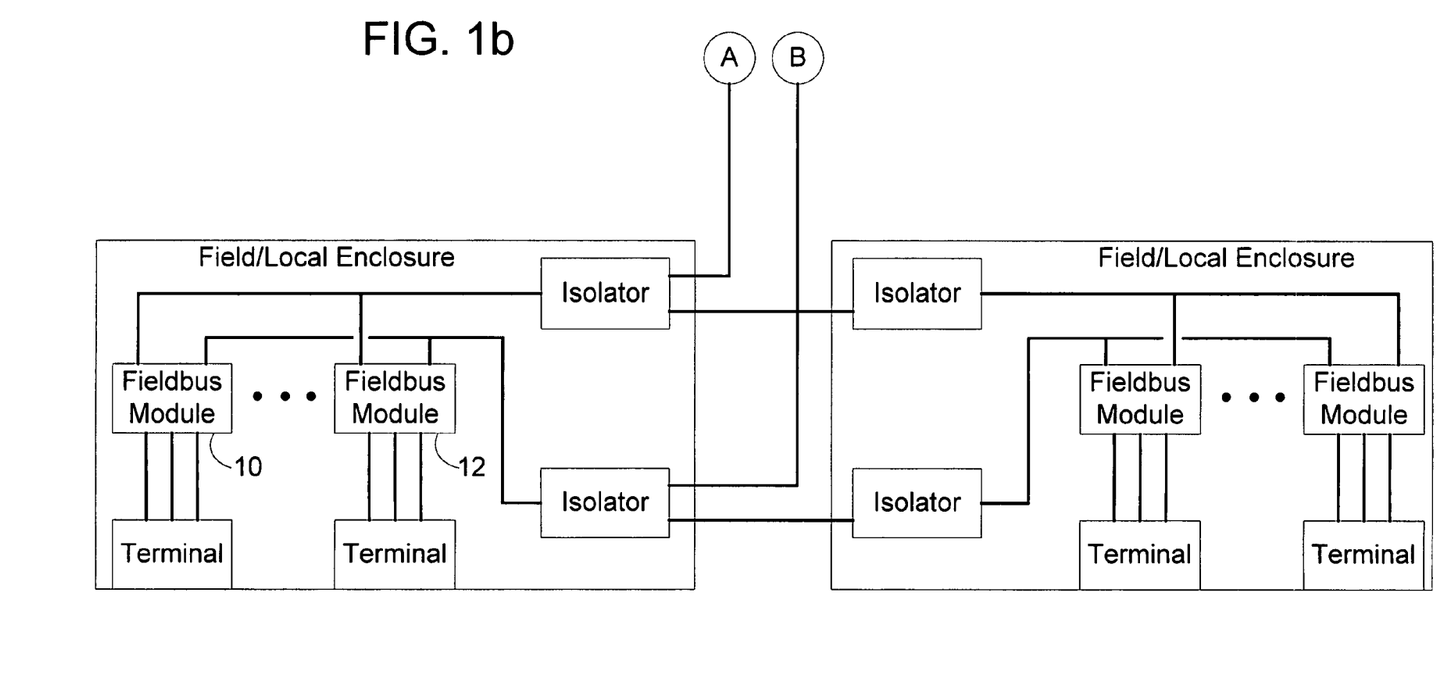

It is noted that while only a single control processor (control processor 2) and workstation 6 are depicted in the illustrative industrial process control system in FIGS. 1a and 1b, it is contemplated that multiple control processors and workstations will be present in process control systems embodying the present invention. Furthermore, the workstation 6, file servers, I/O devices, and/or process control strategy development tools need not be directly connected to the network bus 4. Rather, in embodiments of the present invention, such devices are connected to the network bus 4 via a gateway (not shown). Thus, as those skilled in the art will readily appreciate in view of the disclosed embodiment, the present invention can be implemented into a broad variety of control networks having different topologies and connected computing and I/O devices.

The control processor 2 is connected via a fault tolerant bus 14 (comprising first and second redundant buses) to fieldbus modules 10 and 12. The fault tolerant bus 14 is, for example, a fault tolerant fieldbus according to the IEEE 1118 standard. The fieldbus modules 10 and 12 are, for example, I/A SERIES Fieldbus modules. The fieldbus modules 10 and 12 sense state information provided by sensors on terminal equipment (field devices) incorporated into an industrial process. The state information is provided to the control processor 2 which executes control blocks incorporating the state information provided by the field bus modules 10 and 12, and issues output control signals to the fieldbus modules 10 and 12. The fieldbus modules 10 and 12 transmit appropriate control signals to the field devices according to the output control signals issued by the control processor 2 in order to maintain controlled operation of the industrial process. While not shown in FIGS. 1a and 1b, the types of terminal equipment coupled to the distributed processor modules include industrial equipment such as, for example, field devices utilized in oil refining, chemical manufacturing, and electrical energy generation plants.

Figure 2:
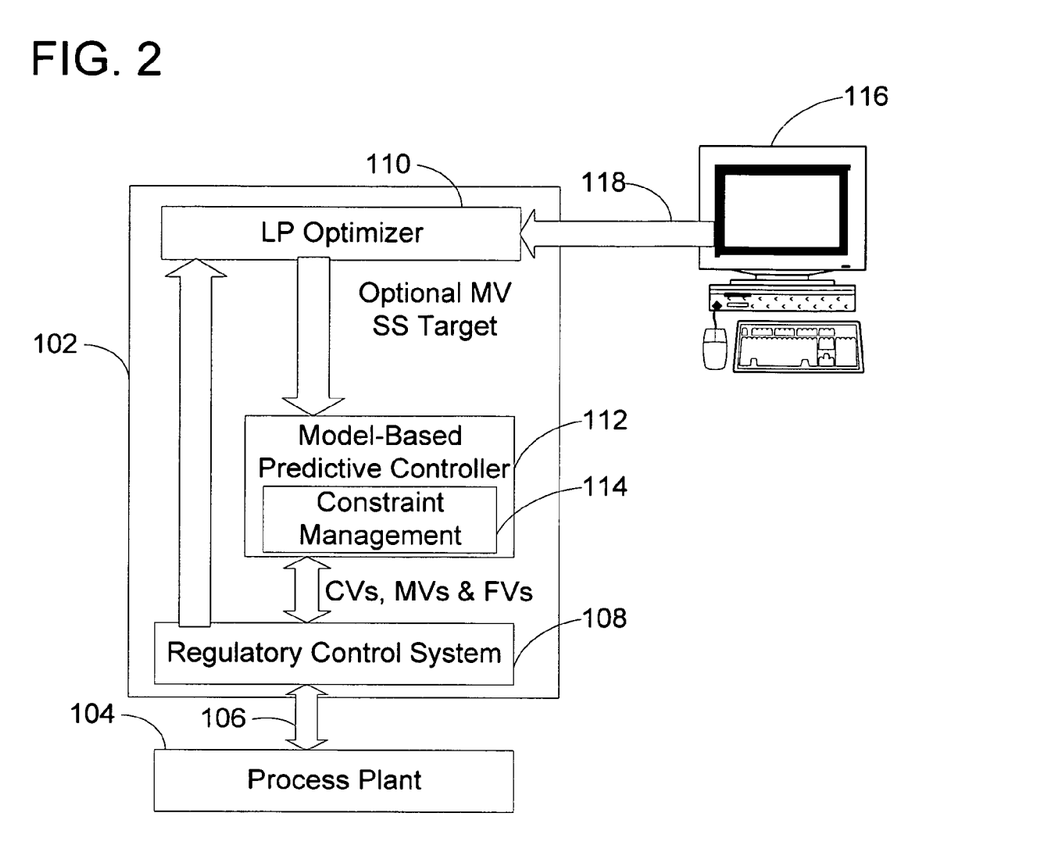
FIG. 2 is a schematic diagram illustratively depicting the hierarchical nature of the process control program structures within an exemplary process control system embodying the present invention.

FIG. 2 depicts an example of a hierarchical arrangement of tasks performed by a control processor, such as control processor 2 (see FIG. 1a), within a process control system embodying the present invention. A control processor 102 is communicatively linked to a process 104 including a set of integrated field devices that sense the state of the process 104 and transmit a set of process variables to the control processor 102 via local control bus 106. The set of process variables are received and processed by a regulatory control system 108 comprising a set of regulatory control blocks. The regulatory control blocks that receive and act upon the set of process variables include well known input, output, PID, and ratio blocks. The regulatory control blocks may perform simple computations to generate new output values based upon the sensed state of the process and setpoint values furnished by higher level process control supervisory tasks within the linear programming optimizer 110 and model-based predictive controller 112. The new output values are transmitted to control-type field devices within the process 104 via output regulatory blocks within the regulatory control system 108. The control blocks within the regulatory control system 108 are free running and act upon the present set of setpoint and process variable values within a process control database.

The model-based predictive controller 112 operates at a first supervisory control level above the regulatory control level. The model-based predictive controller 112 receives process variable information from the regulatory control system 108. The model-based predictive controller 112 incorporates the process variables into a set of control equations, and renders supervisory setpoint values to be incorporated into the regulatory control equations executed by regulatory control (e.g., PID) blocks. A constraint management function 114 performed by the model-based predictive controller 112 ensures that new setpoint values calculated by the model-based predictive controller 112 do not exceed a set of limit values.

At an even higher supervisory level, the linear programming optimizer 110 computes optimal operating status and steady-state target set point values that ensure safe operation of the process, maximize profits, return on investment, etc. within the constraints of the controlled process. The optimal operating status and target set point values are calculated based upon a set of complex linear programs involving potentially hundreds of variables and coefficients representing a particular process control model.

A workstation 116 provides the set of coefficients for use by the linear programming optimizer 110 and model data for use by the model-based predictive controller 112, representing for example costs and physical constraints, via a network link 118. The linear programming optimizer 110 optionally provides manipulated variable (setpoint) steady state target values to the model-based predictive controller 112. In addition to providing control model coefficients, the workstation 116 serves at a window into the process 104. A user may submit requests for the display of the status of selected process variables. A user having supervisory status, authenticated by a security facility, may circumvent the control hierarchy and override current setpoint values established by the supervisory process control programs by writing particular setpoint values into a control database for the process control system.

Figure 3:
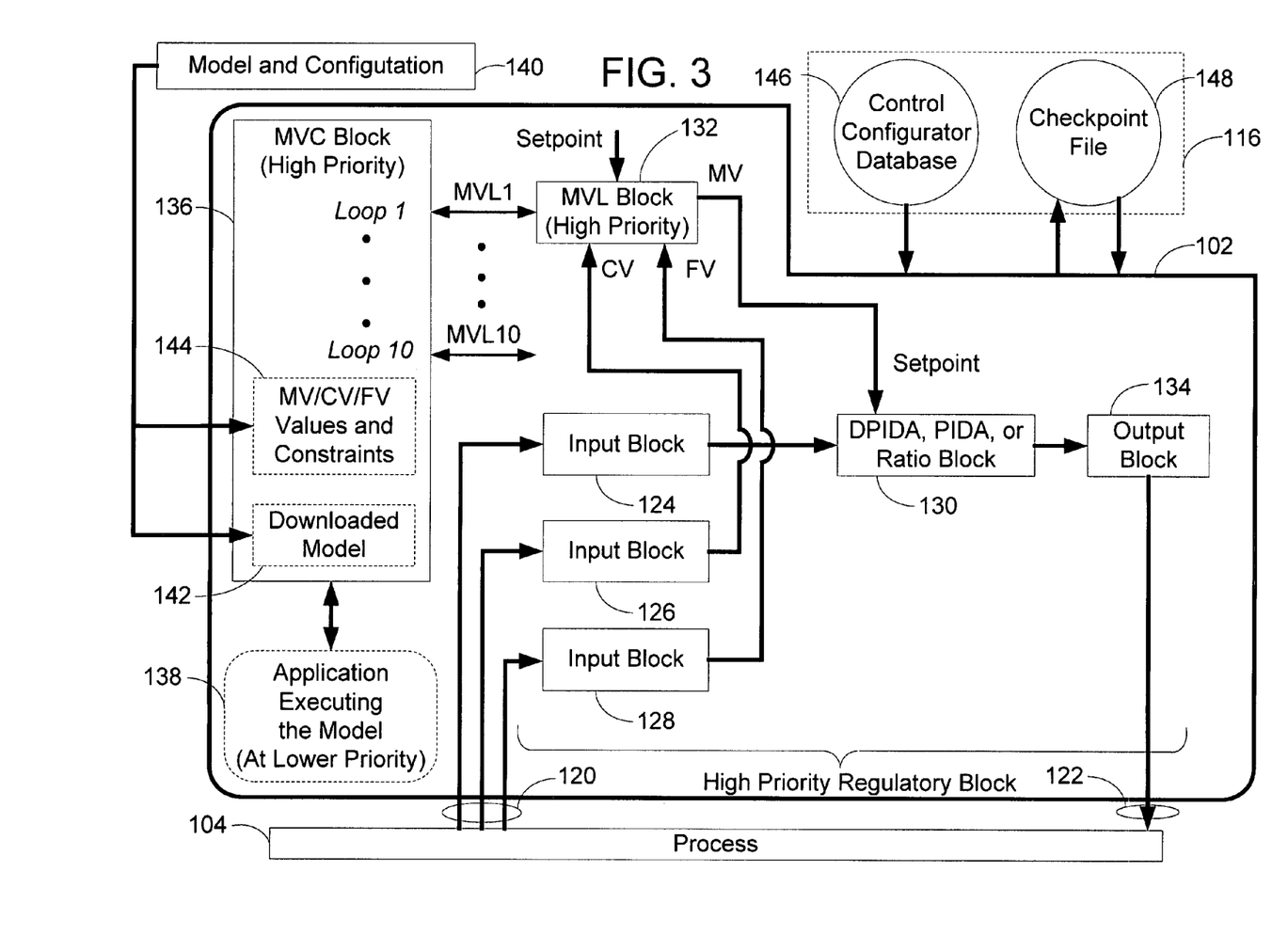
FIG. 3 is a schematic block diagram identifying, and depicting the interrelationships of, control blocks and other process control programs in a control processor and workstation suitable for incorporating the present invention.

Having described the layered, hierarchical arrangement of an exemplary process control system incorporating the present invention attention is directed to FIG. 3 that presents a detailed depiction of the process control software executed within the control processor 102. The control processor 102 communicates with the field devices of the process 104 via a set of process variable inputs 120 and a process control output 122. In the exemplary embodiment of the invention, process signals on input lines 120 are received by a set of input process control blocks 124, 126, and 128.

The terms manipulated variable, controlled variable, and feedforward variable are used a number of times herein. Thus, each is defined generally below. The manipulated variable (MV) is normally the desired position of a downstream control variable in a cascaded loop. In the I/A SERIES, this is either the set point of a PID controller or the ratio of a ratio controller. The controlled variable (CV) is the process variable being controlled by changes to the manipulated variable. For example, in the Foxboro I/A System, this could be the measurement of the temperature or pressure associated with a controlled process. The feedforward variable (FV) is a secondary process variable affected by the primary MV. For example, if the temperature of a process is used to control the flow of some liquid used in the process, the current level of the liquid flow could be used as the feedforward variable in the MV calculation.

The signal received by input block 124, representing the present state of an MV such as a valve position or material temperature, is forwarded to a regulatory control block 130. The regulatory control block 130 is, for example, any one of a number of regulatory control blocks known to those skilled in the art including, without limitation, PID and ratio control blocks.

In general, multivariable loop (MVL) blocks support a multivariable control algorithm in a control processor such as, for example, the CP60 Control Processor of THE FOXBORO COMPANY, An INVENSYS Company. The MVL blocks communicate with other control processor blocks to carry out the multivariable control algorithm. The MVL blocks implement continuous multivariable control of an interacting multivariable process. The MVL blocks utilize setpoints (furnished either manually via a user interface or via an embedded application having supervisory control over the MVL blocks), controlled variable measurements, and feedforward values to compute MV output values for regulatory control blocks.

The MVL blocks provide updated MV output values as setpoint values for underlying regulatory control blocks such as PID and ratio blocks. However, MVL blocks are also capable of performing a number of functions ancillary/supplemental to calculating MV output values. For example, the MVL blocks apply constraints such as value limits and rate of change limits to calculated MV output values. The MVL blocks also support alarm functions by detecting and signaling alarm conditions. The MVL blocks also support secure supervisory control to view and override an MVL output value via commands accepted by the control processor 102 from a workstation. The MVL blocks also furnish readback and status data from the regulatory control blocks to a supervisory control database that supplies input values for an overall process control linear program.

With reference to FIG. 3, a multivariable loop (MVL) block 132 applies input variable values obtained from a number of sources to a control equation/program incorporated within the MVL block 132 to render a manipulated variable (MV) supervisory set point that is written to the regulatory control block 130. In the exemplary embodiment of a multivariable controller embedded within a control processor, the MVL block 132 receives as its inputs a setpoint value (generated by the embedded linear programming optimizer, by a non-embedded supervisory control program, or manually entered by a process operator), a controlled variable (CV) from the input block 126, and a feedforward variable (FV) from the input block 128. For the sake of simplicity, only a single MVL block, and its associated loop are depicted in FIG. 3. However, the current embodiment of the present invention supports up to 10 MVL blocks. In general, the number of MVL blocks included within a single control processor may vary in number without departing from the present invention.

The regulatory control block 130, executing for example a PID control program, renders an output control value based upon the MV generated by the MVL block 132, and the current value of a process variable from the input block 124. The regulatory control block 130 writes the output control value to an output block 134. The output block 134 writes a control value to the process 104 via the process control output 122.

A multivariable controller (MVC) block 136 controls and coordinates sharing/transfer of data between control system components (e.g., workstations, embedded applications, control blocks) as well as the execution of tasks within the control processor 102. The MVC block 136 is the master controller for the multivariable controller and supports a number of functions including: providing an interface for (hosting) downloading model and configuration data from a workstation, controlling the manner of operation of the control processor (as a state machine), and directing execution of the MVL supervisory control blocks and an embedded multivariable control application within the control processor 102.

The MVC block 136 is the primary interface to the multivariable controller functionality (facilitated by an embedded multivariable control application 138, the MVC block 136 and the MVL blocks) embedded within the control processor 102. The MVC block 136 hosts parameters defining the size/dimension of the multivariable controller, identifies links to MVL blocks in the multivariable controller, and establishes/executes a protocol for downloading configuration and model data to the multivariable controller from a workstation.

The MVC block 136, the only MVC block within a single embedded multivariable controller in the preferred exemplary embodiment of the present invention, supports execution of the embedded multivariable control application 138 that carries out an advanced multivariable control scheme for the process 104 according to a process control model. A model-based predictive control program 140 at a workstation, preferably operating in a development environment, downloads a multivariable control model 142 (comprising a set of coefficients to be inserted into a linear program) and an initial set of MV/CV/FV values and constraints 144 to the MVC block 136 within the control processor 102. The control model 142 is copied from the MVC block 136 into a dynamic data space (not shown) used by the embedded multivariable control application 138. The control model 142 is not referenced by the MVC block 136 during its normal operation. However, storing the control model 142 in the MVC block 136 enables the control model to be stored in a checkpoint database for purposes of rebooting in the event of a failure in the control processor 102 necessitating re-loading the control model 142.

The MVC block 136 provides appropriate initial parameter values from the set of MV/CV/FV values and constraints 144 to the embedded control application 138 and the MVL blocks including MVL block 132. Once the model and initial parameters are downloaded from the model-based predictive control program 140 to the control processor 102, the embedded multivariable control application 138, MVC block 136 and associated MVL blocks (e.g., MVL block 132) are free running within the control processor 102 and need no further data from a workstation.

Notwithstanding the free-running nature of the process control blocks referred to above, a user having supervisory control status may read the status of the parameters of the MVC, MVL and/or regulatory control blocks, backup a copy of the MVC control block 136, and/or initiate commands modifying operating parameters associated with the controlled process 104. Such operations, as will be appreciated by those skilled in the art, are facilitated by a control configuration database 146 and a checkpoint file 148 maintained within a temporary or permanently connected workstation or other suitable interface device such as a laptop personal computer—preferably operating in an application environment.

The embedded multivariable control application 138 executes a control program based upon a set of coefficients provided by the control model 142 (and stored in an embedded dynamic database). The embedded multivariable control application 138 reads a set of inputs including: set points, controlled variable measurements, and feedforward values. The control application 138 applies the inputs to the control model 140 and computes manipulated variable output values. The manipulated variable output values are the setpoint inputs for the MVL blocks and associated downstream regulatory control (e.g., PID and ratio) blocks during the course of free-running operation of the control processor 102. In addition, the embedded multivariable control application dynamically calculates the gainset data based on dynamic changes in the constraint conditions of its calculated outputs. The gainset values are used by the embedded multivariable control application 138 to provide new manipulated variable outputs for the MVL blocks including the MVL block 132.

While the embedded multivariable control application 138 can perform virtually any programs desired by a system designer, in a preferred embodiment of the invention the advanced multivariable control application 138 includes a complex linear program that addresses physical constraints and seeks to maximize profitability of the process 104. The complex linear program may include coefficients representing material costs, labor costs, wear upon the physical components of the process 104, present and future values of the output from the process 104, safety measures, etc. Such linear programs, involving scores or even hundreds of variables, are computation intensive and may require many times more central processor unit cycles to complete than a single round of computations to "refresh" the regulatory control blocks 124, 126, 128, 130, and 134; and the supervisory blocks including the MVC block 136 and up to ten MVL blocks (including MVL block 132) supported by the MVC block 136.

Figure 4:
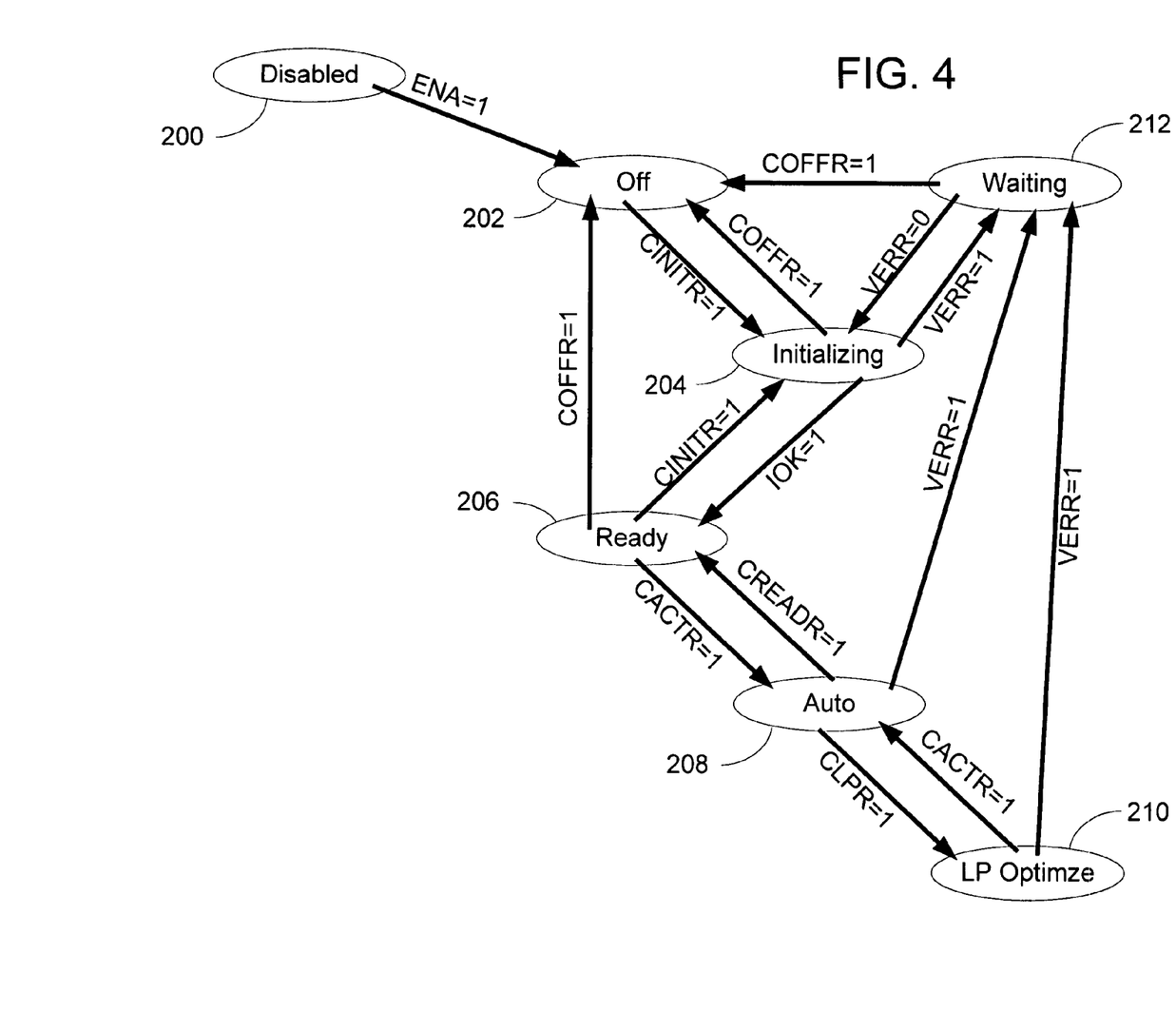
FIG. 4 is a state diagram identifying the various operational states of an exemplary multiple variable controller incorporated into a control processor embodying the present invention.

Turning to FIG. 4, the operation of a multivariable controller is summarized in the form of a state machine. The multivariable controller comprises the embedded control application 138, the MVC block 136, and the multiple MVL blocks, including MVL block 132 in the control processor 102. The various states of the state machine, and the conditions causing transitions between the states are depicted in FIG. 4. Initially, the multivariable controller resides in a Disabled state 200. The Disabled state 200 corresponds to when the MVC block 136 is initially created and configured, and the control model 142 has not yet been downloaded into the control processor 102. Once the control model 142 has successfully loaded on the control processor 102 (including transferring the model to the dynamic database of the embedded multivariable control application 138) the MVC block 136 sets an internal binary Enable switch (ENA=1). Thereafter, the multivariable controller transitions to an Off state 202 wherein the multivariable controller sits in an idle state awaiting a request to initialize. While in the Off state 202, the control processor 102 performs cyclic execution of both the regulatory control blocks and the supervisory MVC/MVL blocks.

While in the Off state 202, the multivariable controller transitions to an Initializing state 204 in response to an operator setting a binary Initialize switch (CINITR=1). In this state the multivariable controller initializes its variables and does not perform any real-time control actions. When initialization of the multivariable controller completes, the multivariable controller sets an internal binary OK switch (IOK=1) and transitions to a Ready state 206. In the Ready state 206, the multivariable controller awaits an operator action setting a binary Activation switch (CACTR=1) to transition to an Auto state 208, or setting the binary Initialize switch (CINITR=1) to reenter the Initializing state 204.

While the multivariable controller is in any state except the Disabled state 200, the MVC, MVL, and regulatory control blocks are executed once every block processing cycle, and the MVC block 136 periodically initiates execution of the embedded multivariable control application 138, to calculate and transmit control values to the process 104. The periodic execution of the MVC block 136, the MVL blocks including MVL block 132, and the embedded multivariable control application is described further herein below in association with a description of FIGS. 5 and 6.

While the multivariable controller is operating in the Auto state 208, an operator may set a linear program optimize switch (CLPR=1). In response, the multivariable controller transitions to the LP Optimize state 210. Thereafter, a supervisory linear program (part of the embedded multivariable control application 138) writes newly calculated manipulated variables to the database referenced by the MVL blocks for use as input setpoint values. If the operator sets the Activation switch (CACTR=1) while the multivariable controller is in the LP Optimize state 210, the multivariable controller will reenter the Auto state 208 and the supervisory linear control program will be disabled.

It is noted that the embedded multivariable control application 138 can detect the occurrence of vital errors that may arise during the course of executing the tasks of the control processor 102. If such errors are detected while the multivariable controller is in the Initializing state 204, Auto state 208, or the LP Optimize state 210, then an Error signal is set (VERR=1) and the multivariable controller transitions to a Waiting state 212. While in the Waiting state 212, execution of the control blocks is suspended until all detected vital errors have been cleared (VERR=0). An operator can cause the multivariable controller to enter the Off state 202 from the Waiting state 212, the Ready state 206, or the Initializing state 204 by setting the Off switch (COFFR=1) via a workstation interface.

As explained and described above, the multivariable controller operates as a state machine. The states of the multivariable controller and the transitions between the states are illustratively depicted in FIG. 4. It is noted that the depicted state machine is merely illustrative and does not preclude other embodiments of the present invention embodying other control structures including not even using a state machine architecture to support control of execution of supervisory and regulatory tasks in the control processor 102.

Before describing steps associated with a sequence of execution of the control blocks and embedded program within the control processor 102, the general issue of executing control blocks by the control processor 102 within a required repetition period is briefly discussed. A generalized solution to the timing issues is described as well.

The control processor 102 is called upon to execute a substantially increased quantity of repeated tasks as a result of migrating supervisory control operations to the control processor. Furthermore, the requirement to execute the regulatory control tasks within a relatively short cycle time cannot be relaxed or compromised. For example, the block processing cycle period must remain at approximately a half second.

On the other hand, the need to regenerate new gainsets for providing new setpoint values for MVL blocks in accordance with higher level, policy-based, optimization schemes implemented by the embedded multivariable control application 138, is generally less urgent. The output values of the embedded multivariable control application 138, in general, do not change greatly over the short term. While very computational intensive, the execution frequency for generating new setpoint values by the embedded multivariable control application 138 can be extended, and completion of computations can be delayed, if needed, to ensure that time-critical computations by the regulatory and supervisory control blocks within the control processor 102 are completed within a block processing cycle.

A general proposed solution to the timing requirements raised by an embedded multivariable control approach to control processor operation is to execute the embedded multivariable control application 138 at a lower execution priority than the control blocks within the control processor 102. The MVC block 136, the MVL blocks (e.g., MVL block 132), and the regulatory control blocks 124, 126, 128, 130, and 134 are all executed at a higher designated priority than the embedded multivariable control application 138. Thus, the embedded multivariable control application 138 is not executed during a block processing cycle period (e.g., 0.5 second interval measured by the MVC block 136) unless/until all the control blocks have been executed. This approach is embodied in an exemplary set of control processor operations summarized in FIGS. 5 and 6 discussed herein below.

Figure 5:
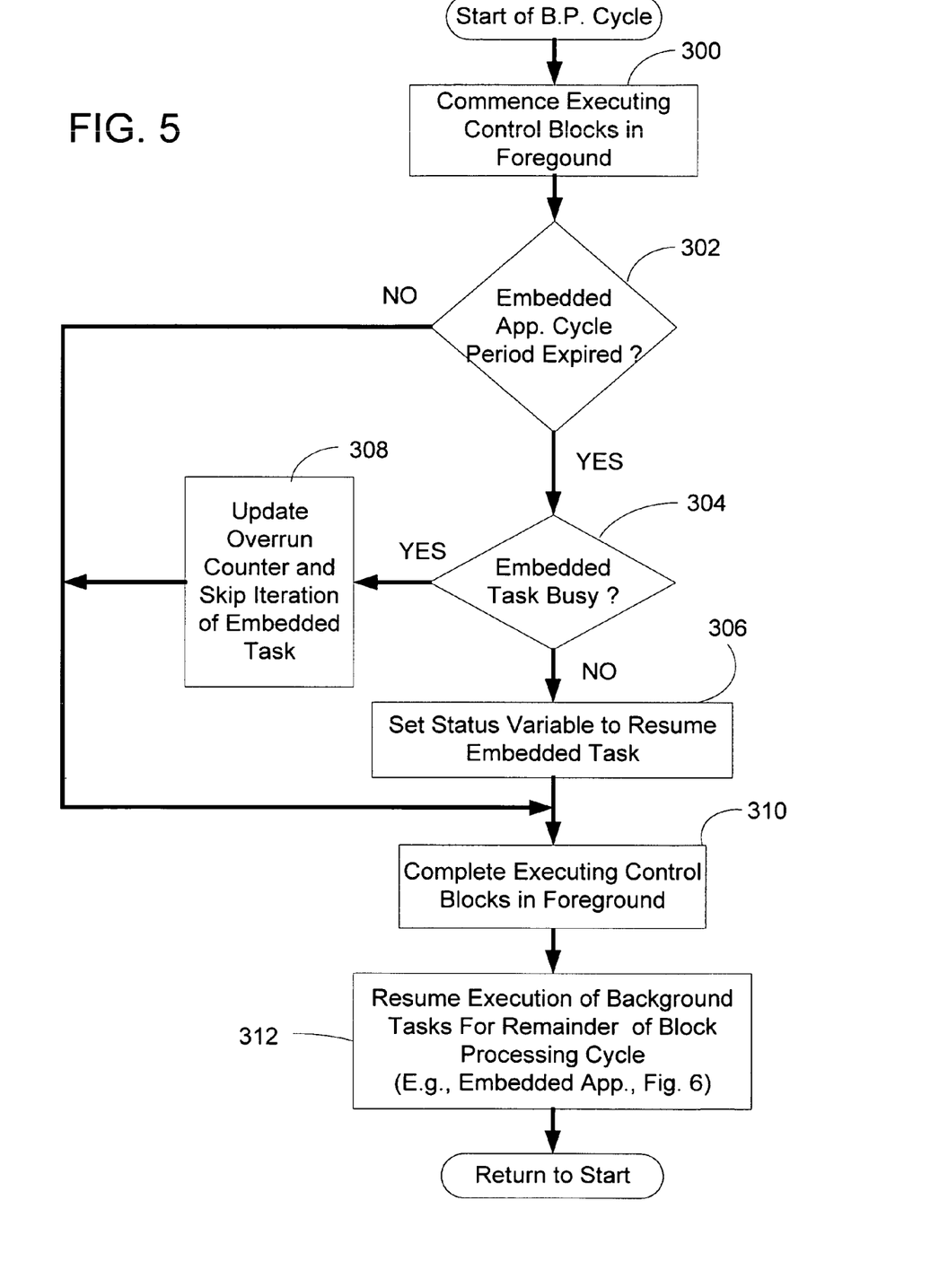
FIG. 5 is a flowchart depicting steps performed by a control processor during a foreground block processing cycle.

With general reference to FIG. 5, steps executed by a control processor 102 during a single block processing cycle period (e.g., 0.5 seconds) are illustratively depicted. In the exemplary embodiment, all of the supervisory and regulatory control blocks are executed in the foreground in response to an interrupt signal activated every block processing cycle (e.g., every 0.5 seconds). After the control blocks have been processed, the remaining portion of the block processing cycle period is used to execute the embedded multivariable control application 138. At the end of the block processing cycle period an interrupt signal commences the control block processing cycle again. If the embedded multivariable control application 138 has not completed executing its tasks, then its current state is saved and the control processor 102 commences control block processing.

With reference now to the specific steps of FIG. 5, in response to a control block processing cycle interrupt, control passes to step 300 wherein the control processor 102 commences sequentially executing the MVC block 136, MVL blocks and regulatory control blocks configured in the control processor 102. The control blocks, when executed, provide the user/process interface for updating the data stored in the control processor 102, transmitting new control signal values to the process 104, and transmitting requested data to connected workstations.

Each block processing cycle, regulatory blocks are executed to update process measurements (CV, FV) and their constraint status (alarm limit detection) from the field data obtained from the process 104. The updated process measurements are stored as MVC/MVL block parameters for the user. When it is time to resume the embedded multivariable control application 138, the process measurements are transformed and copied into the dynamic database of the embedded multivariable control application 138 as inputs to be processed by the embedded control application 138.

The MVC block 136 and the MVL blocks register change requests to the multivariable controller database maintained by these blocks. The change requests include change requests supplied by an operator via a workstation. The operator-supplied requests include state change requests to the multivariable controller, as well as the downstream PID measurements, set points, and constraint status. The change requests also include new process set points (MVs) calculated by the embedded control application 138 and transformed and copied back into the MVC/MVL block parameters. Also copied back are changes to the CV, MV, and FV constraint status, as well as the actual state changes to the MVC Controller.

During steps 302-308, which may actually occur at any point after the commencement of block processing (step 300) during the course of execution of the control blocks, the MVC block 136 determines whether a configured embedded application cycle period has expired and takes appropriate actions in preparation for resuming the background tasks upon completion of the foreground block processing tasks.

The embedded multivariable control application 138, like the control blocks, has a user-configurable cycle period defining the refresh period for the embedded control application 138. This value is generally on the order of several seconds (e.g., 5 seconds) The configured cycle time will be temporarily extended if the MVC block 136 registers (in an overrun counter) a large number of occurrences where the control processor 102 was unable to complete execution of the embedded multivariable control application 138 within the configured embedded application cycle period.

If at step 302 the MVC block determines that the configured cycle period has expired, then control passes to step 304 wherein the MVC block 136 determines whether the embedded multivariable control application 138 is still busy (i.e., an iteration of the embedded multivariable control application task is not completed for the previous configured embedded application cycle period).

At step 304, if the embedded task is not busy, then control passes to step 306, and the MVC block 136 sets a variable to resume execution of the embedded multivariable control application task upon completion of the foreground tasks. Thereafter, control passes to step 310 wherein the control processor 102 completes execution of any remaining control blocks in the foreground.

A block processing cycle time is preferably selected such that the time required for the control processor 102 to complete executing the control blocks will not exceed the block processing cycle time. In fact, considerable time will typically remain in the block processing cycle when block processing is completed to provide a time period in which at least a portion of the embedded multivariable control application 138 can execute. Thus, upon completing execution of the control blocks in the foreground, control passes from step 310 to step 312 wherein the control processor 102 exits the high priority foreground task and resumes lower priority background task execution for the remainder of the block processing cycle period. The background tasks include executing the embedded multivariable control application 138 (see, FIG. 6) if a request to resume execution of the embedded task is pending or the embedded task is busy. Step 312 ends when an interrupt signals the beginning of a next control block processing cycle period, control returns to the Start and control block processing commences again at step 300. Thus, while operating in any state except the Disabled state 200, the multivariable controller repeatedly executes through the set of steps identified in FIG. 5.

However, at step 304 if the MVC block 136 determines that the embedded multivariable control application task is busy, then control passes to step 308, and the MVC block 136 increments the overrun counter, resets the embedded application cycle timer (thereby skipping an iteration of the embedded task until the expiration of a next configured cycle period), and passes to step 310 described herein above.

Finally, if at step 302, the MVC block 136 determines that the embedded application cycle period has not expired, then control passes to step 310.

Figure 6:
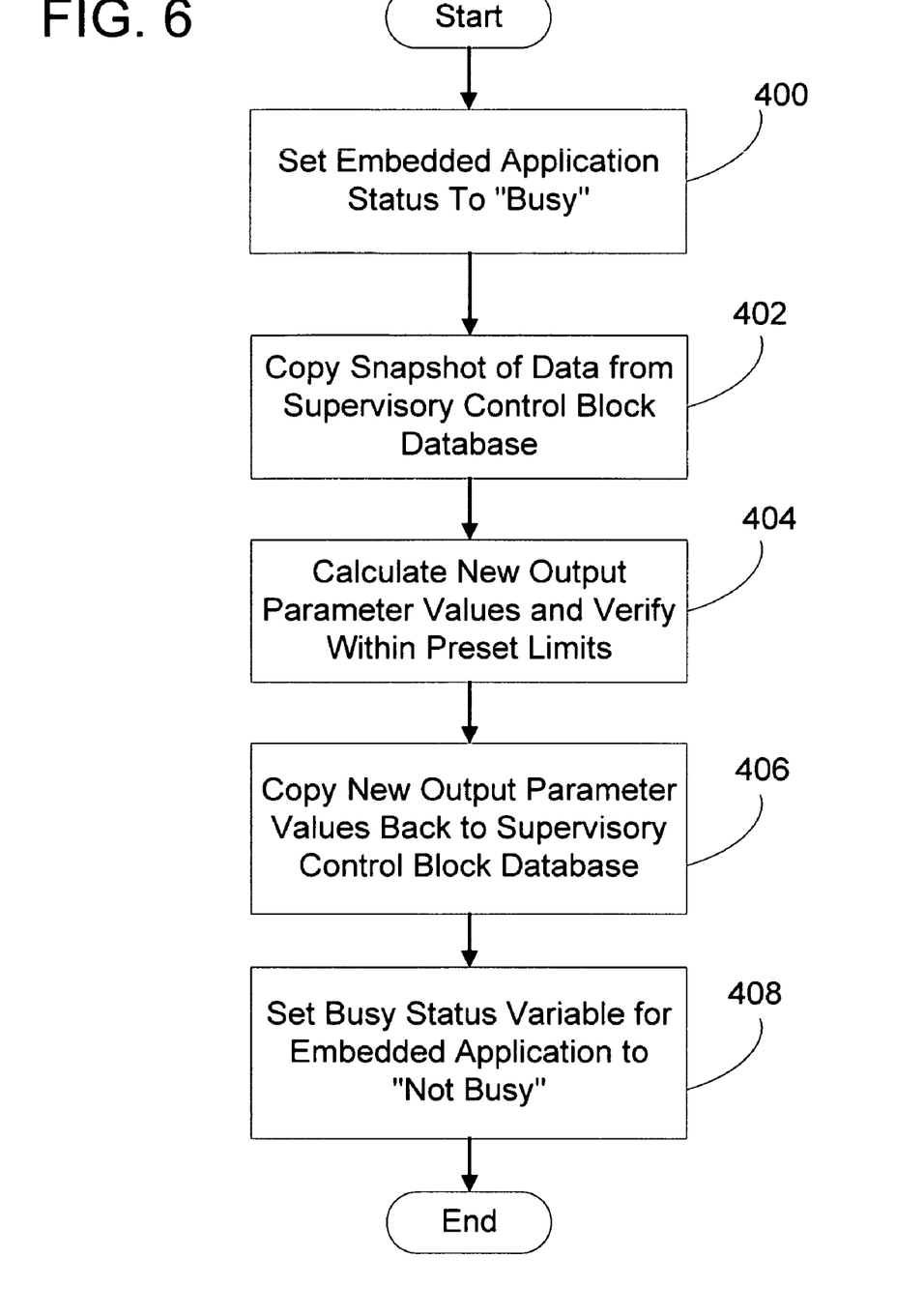
FIG. 6 is a flowchart depicting steps performed by a background embedded multivariable control application processing cycle.

Turning now to FIG. 6, the steps are summarized for executing the embedded multivariable control task 138 as a relatively lower priority (e.g., background) task.

First, at step 400, the busy status variable associated with the embedded multivariable control application 138 is set to "Busy" This status will be tested during step 304 when the MVC block 136 determines at step 302 that an embedded application cycle period has again expired.

Next, during step 402, a snapshot of the data contained within the MVC and MVL blocks is taken and stored within the dynamic database used by the embedded multivariable control application 138. Next, during step 404, the embedded application 138 calculates new output parameters based upon the snapshot data obtained during step 402. The snapshot data does not necessarily equal the present state of the corresponding process parameters at the time it is used since the embedded application may run in the foreground over a period of several seconds. However, it is reasonably close to the present process variable values to be used to calculate new gainsets for providing updated setpoint values to the MVL blocks of the control processor 102.

Upon completing calculating new output parameter values and comparing the output values to supplied limits, at step 406 the embedded multivariable control application 138 copies the new output parameter values to the appropriate data locations accessed by the MVC block 136 and the MVL blocks including MVL block 132. Next, at step 408, the busy status variable associated with the embedded multivariable control application 138 is set to "Not busy While the above example describes an exemplary multi-priority level execution scheme including two priority levels. In yet another embodiment of the invention, additional tiers are incorporated to distinguish execution of regulatory blocks and supervisory blocks into two separate priority levels above the lower priority embedded multivariable control application 138. Furthermore, the embedded multivariable control application 138 is assigned a lowest status of all tasks (except the idle task). Thus, additional task priority levels are available to insert additional tasks without the performance of the additional tasks being impacted by the embedded multivariable control application 138.

Thus, in summary of the multi-tiered process control scheme illustratively depicted in FIGS. 5 and 6 above, the MVC/MVL blocks of a multivariable controller are executed along with regulatory control blocks each block processing cycle, commenced for example every 0.5 seconds, at a highest priority level. When the MVC block is executed at the highest priority level, a decision is made whether a cycle time for executing an embedded application task has expired. The decision to commence another embedded application cycle is based on an operator-configured cycle period downloaded as part of a control model data base that includes the embedded application and relevant control parameter values. For example, if the embedded application cycle period 10 seconds, then the embedded application is generally commenced once for every 20 block processing cycles.

The embedded application is preemptively executed at a lower priority, in the portion of a block processing cycle period after all the control blocks have been executed, to complete a set of predictive control calculations to render gainsets containing setpoint values for the MVL blocks within the control processor 102. After the embedded application completes its set of calculations and stores results in memory accessible by at least the supervisory control blocks, execution of the embedded application is suspended until the embedded application cycle period has elapsed and the embedded application re-calculates and re-stores setpoint values for the control processor 102.

As explained above, the embedded multivariable control application 138 is preemptively executed. Thus, the time remaining within block processing cycles after execution of control blocks at the higher priority may be insufficient to retrieve relevant variables from the MVL blocks, re-calculate gainsets, and re-store the full set of setpoint values for the MVL blocks within the configured embedded application cycle period. If the embedded multivariable control application is still executing when the embedded application cycle period expires, an iteration of the embedded application cycle will be skipped.

Illustrative embodiments of the present invention and certain variations thereof have been provided in the Figures and accompanying written description. Those skilled in the art will readily appreciate from the above disclosure that many variations to the disclosed embodiment are possible including for example using program structures other than control blocks to perform the above described control processor tasks. While a series of steps have been summarized for carrying out a multi-tiered task prioritization scheme within a control processor running an embedded multivariable controller, steps may be added, removed, rearranged or modified without departing from the scope of the invention. The controlled process architecture and environment disclosed herein are exemplary as well. The present invention is not intended to be limited to the disclosed embodiments. Rather the present invention is intended to cover the disclosed embodiments as well as others falling within the scope and spirit of the invention to the fullest extent permitted in view of this disclosure and the inventions defined by the claims herein below.

What is claimed is:

1. A control processor for executing a set of control tasks defining dynamic model-based interactive control of an industrial process, the control processor comprising:
   an embedded control task comprising a multivariable linear program including a set of output values corresponding to process setpoints; and
   a set of control blocks including regulatory control blocks having output values that are transmitted by the control processor to field devices coupled to the industrial process, wherein the embedded control task executes at a lower execution priority than an execution priority of the set of control blocks.

2. The control processor of claim 1 wherein the set of control blocks comprise supervisory control blocks.

3. The control processor of claim 2 wherein the supervisory control blocks include a multivariable control block including computer instructions facilitating communication of data between the control processor and a workstation.

4. The control processor of claim 3 wherein the multivariable control block includes computer instructions for receiving and storing a process control model to be implemented by the embedded control task.

5. The control processor of claim 2 wherein the supervisory control blocks include at least one multivariable loop block including computer instructions for providing an input value for a regulatory control block.

6. The control processor of claim 5 wherein the regulatory control block is a proportional-integral-derivative block.

7. The control processor of claim 5 wherein the regulatory control block is a ratio block.

8. The control processor of claim 1 further comprising a repetition cycle parameter specifying a period for re-commencing a cycle of the embedded control task.

9. The control processor of claim 8 wherein the set of control blocks includes a supervisory control block including a sequence of instructions to determine when to recommence a cycle of the embedded task in accordance with a value specified by the repetition cycle parameter.

10. The control processor of claim 1 further comprising a block processing cycle parameter specifying a repetition period for re-commencing a cycle of executing the set of control blocks.

11. The control processor of claim 10 further comprising a repetition cycle parameter specifying a period for recommencing a cycle of executing the embedded control task.

12. The control processor of claim 11 wherein a period specified by the repetition cycle parameter exceeds a period specified by the block processing cycle parameter.

13. A method for operating a control processor, in an industrial process control environment, to establish operating values including a set of setpoint values and a set of process control variables associated with control elements in a controlled industrial process based upon a set of input variables including process variables provided to the control processor and representing the present state of the controlled industrial process, the method comprising the steps of:
   executing, by the control processor, an embedded multivariable control application including computer instructions facilitating computing a setpoint value corresponding to a process control variable; and
   executing, by the control processor, a set of control blocks including regulatory control blocks for receiving and storing a set of process variables representing the present state of a controlled process, wherein the embedded multivariable control application executes at a lower execution priority than an execution priority of the set of control blocks.

14. The method of claim 13 wherein the set of control blocks comprise supervisory control blocks.

15. The method of claim 14 wherein the supervisory control blocks include a multivariable control block and further including the step of downloading data from a workstation to a database accessed by the multivariable control block.

16. The method of claim 15 further comprising the steps of receiving and storing, within the database accessed by the multivariable control block, a process control model to be implemented by the embedded multivariable control application.

17. The method of claim 14 wherein the supervisory control blocks include at least one multivariable loop block, and further comprising the step of providing an input value for a regulatory control block in accordance with execution of instructions and data associated with the at least one multivariable loop block.

18. The method of claim 17 wherein the regulatory control block is a proportional-integral-derivative block.

19. The method of claim 17 wherein the regulatory control block is a ratio block.

20. The method of claim 13 further comprising the step of maintaining a repetition cycle parameter specifying a period for re-commencing a cycle of the embedded multivariable control application.

21. The method of claim 20 wherein the set of control blocks includes a supervisory control block, and further comprising the step of determining, by the supervisory control block, when to re-commence a cycle of the embedded multivariable control application in accordance with a value specified by the repetition cycle parameter.

22. The method of claim 13 further comprising the step of maintaining a block processing cycle parameter specifying a repetition period for re-commencing a cycle of executing the set of control blocks.

23. The method of claim 22 further comprising the step of maintaining a repetition cycle parameter specifying a period for re-commencing a cycle of executing the embedded multivariable control application.

24. The method of claim 23 wherein a period specified by the repetition cycle parameter exceeds a period specified by the block processing cycle parameter.

25. An industrial process control computer having multiple operating levels including:
   a background control program execution level wherein the process control computer executes an embedded multivariable process control application, the embedded control application including instructions for executing a multivariable linear program to generate a set of values corresponding to process control variable setpoints; and a foreground control block execution level wherein the process control computer executes a set of control blocks, at a higher execution priority level than the background control program execution level, the set of control blocks including program instructions that, when executed, receive and store a set of process variable values representing the state of a controlled process.

* * * * *